(12) United States Patent
Koiji et al.

(10) Patent No.: US 11,900,694 B2
(45) Date of Patent: Feb. 13, 2024

(54) PARKING ASSIST SYSTEM

(71) Applicant: SUBARU CORPORATION, Tokyo (JP)

(72) Inventors: Masayoshi Koiji, Tokyo (JP); Otoki Yagi, Tokyo (JP); Cong Kien Nguyen, Tokyo (JP); Tomomi Heta, Tokyo (JP); Reo Harada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/866,212

(22) Filed: Jul. 15, 2022

(65) Prior Publication Data

US 2023/0025490 A1    Jan. 26, 2023

(30) Foreign Application Priority Data

Jul. 26, 2021    (JP) ................. 2021-121757

(51) Int. Cl.
| | |
|---|---|
| *G08G 1/14* | (2006.01) |
| *G06V 20/58* | (2022.01) |
| *B60W 30/06* | (2006.01) |
| *B60W 50/14* | (2020.01) |

(52) U.S. Cl.
CPC .......... *G06V 20/586* (2022.01); *B60W 30/06* (2013.01); *B60W 50/14* (2013.01); *G08G 1/143* (2013.01); *G08G 1/145* (2013.01); *B60W 2050/146* (2013.01); *B60W 2420/42* (2013.01); *B60W 2540/215* (2020.02); *G06V 2201/08* (2022.01)

(58) Field of Classification Search
CPC .. G06V 20/586; G06V 2201/08; G06V 20/56; B60W 30/06; B60W 50/14; B60W 2050/146; B60W 2420/42; B60W 2540/215; G08G 1/143; G08G 1/145; G08G 1/168; B62D 15/0285
USPC ................ 340/932.2, 933, 937, 988, 990
See application file for complete search history.

(56) References Cited

U.S. PATENT DOCUMENTS

| | | | | |
|---|---|---|---|---|
| 2018/0315312 | A1* | 11/2018 | Hayakawa | ............. B60R 21/00 |
| 2019/0184983 | A1* | 6/2019 | Tada | .................... B60W 30/06 |
| 2020/0193187 | A1* | 6/2020 | Okada | ................. G06V 20/586 |
| 2020/0307554 | A1* | 10/2020 | Lai | ........................ G06V 20/582 |
| 2021/0357666 | A1* | 11/2021 | Kaneko | ................. G06V 10/44 |

FOREIGN PATENT DOCUMENTS

JP    2021-003926 A    1/2021

\* cited by examiner

*Primary Examiner* — Anh V La
(74) *Attorney, Agent, or Firm* — Rimon P.C.; Tomoki Tanida (57) ABSTRACT

A parking assist system for a vehicle includes an environment information obtainer, a storage, a parked vehicle detector, a space determiner, and a parking possibility determiner. The storage stores a reference parking width to be used for parking the vehicle. The parked vehicle detector detects a parked vehicle. The space determiner compares a width of a space next to the parked vehicle with the reference parking width and determines whether the width of the space is greater than or equal to the reference parking width. If the width of the space is found to be greater than or equal to the reference parking width, the parking possibility determiner determines whether a target object is detected at a back side of the space. If the target object is not detected, the parking possibility determiner determines that parking in the space is prohibited.

7 Claims, 9 Drawing Sheets

PARKING ASSIST SYSTEM

CROSS-REFERENCE TO RELATED APPLICATIONS

The present application claims priority from Japanese Patent Application No. 2021-121757 filed on Jul. 26, 2021, the entire contents of which are hereby incorporated by reference.

BACKGROUND

The disclosure relates to a parking assist system which can prevent a location where parking is prohibited from being displayed on a monitor as a parking space when performing parking assist in a parking lot where the lines of parking spaces drawn on the road surface are not recognized.

Hitherto, a parking assist system which assists a driver in parking a vehicle within the lines of a parking space in a parking lot so as to reduce the burden on the driver is known. In this type of parking assist system, while a driver is driving a vehicle in a parking lot, a control unit detects options of available parking spaces and displays the detected options on a monitor. The driver then selects a desired one of the parking space options.

Then, the control unit forms a parking guiding route for guiding the vehicle to park in the parking space selected by the driver and assists the vehicle in automatically parking in the parking space in accordance with the parking guiding route. Alternatively, the driver drives and parks the vehicle by himself/herself by following the parking guiding route displayed on the monitor.

In the above-described known parking assist system, to let a vehicle park in a parking space, the lines of available parking spaces are first detected. If the road surface in a parking lot is covered with snow or mud after flooding, however, the parking space lines drawn on the road surface are difficult to recognize. In such a case, the parking assist system may fail to form a parking guiding route for guiding the vehicle to a parking space.

A driver usually wants assistance from a parking assist system under such a poor environment where parking space lines are difficult to recognize rather than under a good environment. Japanese Unexamined Patent Application Publication (JP-A) No. 2021-3926, for example, discloses the following technology. When parking space lines in a parking lot are difficult to identify due to snow, information on a pair of tracks, which are assumed to be a pair of tire tracks of a vehicle left on the snow, is first obtained. Then, a position at which the tire tracks are no longer found at the back of a parking space is determined to be a position at which the vehicle is to stop to park. Then, a target parking guiding route is formed to guide the vehicle to this position along the pair of tracks.

SUMMARY

An aspect of the disclosure provides a parking assist system to be applied to a vehicle. The parking assist system is configured to guide the vehicle to a parking space in a parking lot. The parking assist system includes an environment information obtainer, a storage, a parked vehicle detector, a space determiner, and a parking possibility determiner. The environment information obtainer is configured to obtain environment information on an environment around the vehicle. The storage is configured to store a reference parking width to be used for parking the vehicle. The parked vehicle detector is configured to detect a parked vehicle in the parking lot, based on the environment information obtained by the environment information obtainer. The space determiner is configured to compare a width of a space next to the parked vehicle detected by the parked vehicle detector with the reference parking width and to determine whether the width of the space is greater than or equal to the reference parking width. The parking possibility determiner is configured to, in a case where the space determiner has determined that the width of the space next to the parked vehicle is greater than or equal to the reference parking width, determine whether a target object is detected at a back side of the space, based on the environment information obtained by the environment information obtainer. The parking possibility determiner is configured to determine that parking in the space is prohibited in a case where the target object is not detected.

An aspect of the disclosure provides a parking assist system to be applied to a vehicle. The parking assist system is configured to guide the vehicle to a parking space in a parking lot. The parking assist system includes a sensor, a storage, and circuitry. The sensor is configured to obtain environment information on an environment around the vehicle. The storage is configured to store a reference parking width to be used for parking the vehicle. The circuitry is configured to detect a parked vehicle in the parking lot, based on the environment information obtained by the sensor. The circuitry is configured to compare a width of a space next to the detected parked vehicle with the reference parking width. The circuitry is configured to determine whether the width of the space is greater than or equal to the reference parking width. The circuitry is configured to, in a case where the width of the space next to the parked vehicle is found to be greater than or equal to the reference parking width, determine whether a target object is detected at a back side of the space, based on the environment information. The circuitry is configured to determine that parking in the space is prohibited in a case where the target object is not detected.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

FIG. 5 is a bird's eye view of part of a parking lot illustrating a state in which available parking spaces are being searched for;

DETAILED DESCRIPTION

In the above-described type of known parking assist control, an available parking space (parking position) is first displayed on a monitor. When a driver has selected the displayed parking position, a guiding route for guiding the vehicle to park at the selected parking position is formed and is displayed on the image of the parking position on the monitor. If this parking assist control is applied to the technology disclosed in JP-A No. 2021-3926, when a pair of tracks are detected in a parking lot, a space where this pair of tracks is found is set to be a target parking position and is displayed on the monitor, and a parking guiding route is formed and displayed on the image of the target parking position.

Tire tracks on the snow are formed, not only in parking spaces, but also in a driving lane of a parking lot. Especially in the case of heavy snow on the road, many vehicles may repeatedly pass on the first formed tracks. As a result, a driving lane where parking is prohibited may be wrongly recognized as a parking position and be displayed on a monitor, which may disappoint a driver.

It is thus desirable to reduce the possibility that a location where parking is prohibited is wrongly recognized as a parking space so as not to disappoint a driver even when the lines of a parking space drawn on the road surface are not recognized. It is also desirable to provide a parking assist system that can assist parking of a vehicle in this manner when assisting the vehicle in parking in a parking space by using a parking assist function.

Figure 1:
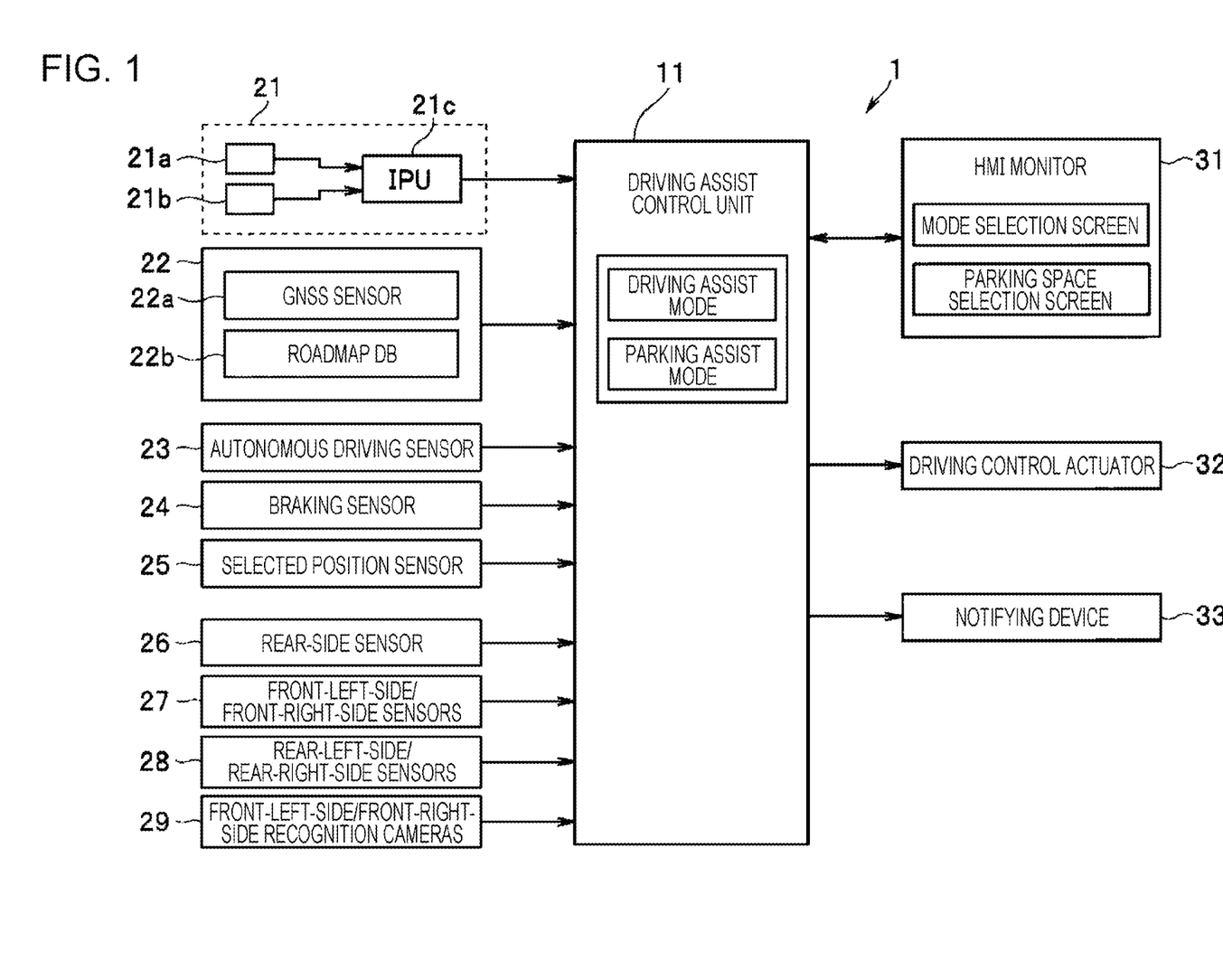
FIG. 1 is a schematic block diagram of a parking assist system.

An embodiment of the disclosure will be described below with reference to the accompanying drawings. A parking assist system 1 illustrated in FIG. 1 is installed in a vehicle M (see FIG. 5). The parking assist system 1 includes a driving assist control unit 11. The driving assist control unit 11 is constituted by a microcontroller including a central processing unit (CPU), a random access memory (RAM), a read only memory (ROM), a rewritable non-volatile memory (such as a flash memory or an electrically erasable programmable read only memory (EEPROM)), and a peripheral device. In the ROM, programs and fixed data, such as those for executing processing by the CPU, are stored. The RAM serves as a work area which is used for the CPU and temporarily stores various items of data used by the CPU. The CPU is also called a microprocessor (MPU) or a processor. Instead of a CPU, a graphics processing unit (GPU) or a graph streaming processor (GSP) may be used. Alternatively, a CPU, a GPU, and a GSP may be selectively combined and used.

When a driver has selected a desired assist mode, the driving assist control unit 11 performs driving assist in the selected assist mode. Assist modes provided by the driving assist control unit 11 are a driving assist mode and a parking assist mode.

The driving assist mode is executed by the driving assist control unit 11 in the following manner. Based on vehicle position information obtained by a global navigation satellite system (GNSS) sensor 22a of a map locator unit 22, which will be discussed later, the driving assist control unit 11 performs map matching to match the position of the vehicle M onto a roadmap stored in a roadmap database 22b. The driving assist control unit 11 then causes the vehicle M to autonomously drive along a preset target traveling road in a self-driving zone. On a driving road where autonomous driving is difficult, the driving assist control unit 11 performs known driving control, such as vehicle-to-vehicle distance control (adaptive cruise control (ACC)), active lane keep (ALK) control, and lane departure prevention (LDP) control, to cause the vehicle M to drive along a driving lane and, if a leading vehicle is detected, to follow the leading vehicle.

After the vehicle M has entered a parking lot, when the driver selects the parking assist mode while driving the vehicle M by himself/herself in the parking lot, the driving assist control unit 11 searches for spaces where parking is allowed (hereinafter may also be called parking allowed spaces) and lets the driver know. When the driver selects one of the parking allowed spaces, the driving assist control unit 11 causes the vehicle M to automatically park in the selected space. Alternatively, the driving assist control unit 11 displays a parking guiding route on a plan view of a vehicle image and a surrounding image displayed on a human machine interface (HMI) monitor 31 so as to assist the driver in parking the vehicle M in the selected space by himself/herself. Details of the HMI monitor 31 will be discussed later.

Sensors and units that obtain information on the driving state (including the position and the direction) of the vehicle M and surrounding environment information of the vehicle M, which are used for executing the driving assist mode and the parking assist mode, are coupled to the input side of the driving assist control unit 11.

In the embodiment, as the sensors and units used for executing the driving assist mode and the parking assist mode, a front-side recognition sensor 21, a map locator unit 22, an autonomous driving sensor 23, a braking sensor 24, a selected position sensor 25, a rear-side sensor 26, front-left-side/front-right-side sensors 27, rear-left-side/rear-right-side sensors 28, and front-left-side/front-right-side recognition cameras 29 are provided. The braking sensor 24 turns ON a brake pedal by detecting an amount by which the driver has stepped on the brake pedal. The selected position sensor 25 detects a position selected as a result of the driver operating a select lever of transmission. The rear-side sensor 26 obtains information on the environment at the rear side of the vehicle M. In one embodiment, the front-side recognition sensor 21, the rear-side sensor 26, the front-left-side/front-right-side sensors 27, the rear-left-side/rear-right-side sensors 28, and the front-left-side/front-right-side recognition cameras 29 may serve as an "environment information obtainer."

The front-side recognition sensor 21 is an image sensor. In the embodiment, the front-side recognition sensor 21 includes a stereo camera and an image processing unit (IPU) 21c. The stereo camera is constituted by a main camera 21a and a sub-camera 21b and uses charge-coupled devices (CCDs) or complementary metal oxide semiconductors (CMOSs), for example, as imaging elements. The main camera 21a and the sub-camera 21b have a predetermined base line length and are located on a front side of the vehicle M at a position above a rear-view mirror and near the windshield. The main camera 21a and the sub-camera 21b are disposed horizontally symmetrically along the width of the vehicle M with a space therebetween. The front-side recognition sensor 21 processes, by using the IPU 21c, an image of a predetermined area indicated by environment information obtained by the main camera 21a and the sub-camera 21b and sends the processed image to the driving assist control unit 11.

The map locator unit 22 includes a GNSS sensor 22a and a roadmap database 22b. The GNSS sensor 22a receives positioning signals emitted from multiple positioning satellites so as to obtain position coordinates of the vehicle M. The roadmap database 22b is a large-capacity storage medium, such as a hard disk drive (HDD), and stores roadmap information. As the roadmap information, the roadmap database 22b stores various types of road information (such as local roads, highways, freeways, road shapes, road directions, lane widths, and the number of lanes) used for executing the driving assist mode and also stores static information on parking lots (such as position information of the entrances and exits of parking lots and space information on each parking lot) used for executing the parking assist mode.

The driving assist control unit 11 performs map matching to match the position coordinates (latitude, longitude, and altitude) of the vehicle M obtained by the GNSS sensor 22a onto a roadmap indicated by the roadmap information stored in the roadmap database 22b, thereby estimating the current position of the vehicle M on the roadmap.

The autonomous driving sensor 23 is a sensor set used for allowing the vehicle M to autonomously drive. The autonomous driving sensor 23 is constituted by sensors, such as a vehicle velocity sensor that detects the velocity of the vehicle M, a yaw rate sensor that detects a yaw rate acting on the vehicle M, and a longitudinal acceleration sensor that detects the longitudinal acceleration.

The rear-side sensor 26 is constituted by a combination of a monocular camera using CCDs or CMOSs, for example, as imaging elements and at least one of an ultrasonic sensor, a millimeter wave radar, a microwave radar, an infrared sensor, a laser radar, or light detection and ranging (LiDAR). Alternatively, the rear-side sensor 26 may include a stereo camera constituted by a main camera and a sub-camera, as in the above-described front-side recognition sensor 21.

The front-left-side/front-right-side sensors 27 are constituted by a front-left-side sensor and a front-right-side sensor which are respectively installed on the left and right ridges of a front bumper of the vehicle M, for example, and respectively scan the area from the obliquely front left side to the left side and the area from the obliquely front right side to the right side in a circular sector shape. The rear-left-side/rear-right-side sensors 28 are constituted by a rear-left-side sensor and a rear-right-side sensor which are respectively installed on the left and right ridges of a rear bumper of the vehicle M, for example, and respectively scan the area from the rear side to the left side and the area from the rear side to the right side, which are difficult to scan by the front-left-side/front-right-side sensors 27, in a circular sector shape. The front-left-side/front-right-side sensors 27 and the rear-left-side/rear-right-side sensors 28, which are each constituted by a millimeter radar, a microwave radar, and/or a LiDAR, for example, receive waves reflected by a target object (such as a parked vehicle Pv or an outer wall when the parking assist mode is executed) so as to obtain environment information, such as the distance from the vehicle M to the target object and the direction of the target object.

The front-left-side/front-right-side recognition cameras 29 are constituted by a front-left-side recognition camera and a front-right-side recognition camera which are respectively fixed to the places near the left and right side-view mirrors. The front-left-side/front-right-side recognition cameras 29 detect the presence or the absence of parking space lines, tire tracks, and footprints on the left and right sides of the vehicle M, which are not included in the angle of view of the front-side recognition sensor 21. The front-left-side/front-right-side recognition cameras 29 each include imaging elements, such as CCDs or CMOSs, and an IPU. The front-left-side/front-right-side recognition cameras 29 process, by using the IPUs, images on the front left and right sides of the vehicle M indicated by environment information and captured by the imaging elements and then send the processed images to the driving assist control unit 11.

The driving assist control unit 11 is coupled to the HMI monitor 31. On the HMI monitor 31, various screens, such as a mode selection screen and a parking space selection screen (see FIGS. 10A and 10B), are displayed. The mode selection screen is a screen for instructing the driver to select one of the driving assist mode and the parking assist mode to be executed by the driving assist control unit 11. On the parking space selection screen, a space where parking is allowed is displayed and the driver is instructed to decide whether to select this space. The HMI monitor 31 may double as a multi-information display of a combination meter or a navigation display device (navigation monitor) of a car navigation system.

A driving control actuator 32 and a notifying device 33 are coupled to the output side of the driving assist control unit 11. The driving control actuator 32 is an actuator set including a power actuator, an electric power steering (EPS) actuator, and a brake actuator, for example, which assist the driving of the vehicle M. The power actuator controls output from drive sources, such as an engine and an electric motor. The EPS actuator controls driving of an EPS motor. The brake actuator adjusts the brake fluid pressure to be applied to a brake wheel cylinder provided in each wheel. The notifying device 33 supplies various types of voice information to the driver while the driving assist mode or the parking assist mode is being executed.

The driving assist control unit 11 has a parking assist control function to assist the vehicle M in parking in a parking space on behalf of the driver or to assist the driver in parking by himself/herself. For example, the driving assist control unit 11 performs parking assist control in accordance with a parking assist control routine illustrated in FIG. 2. This routine is executed at regular intervals after the system is started.

Figure 2:
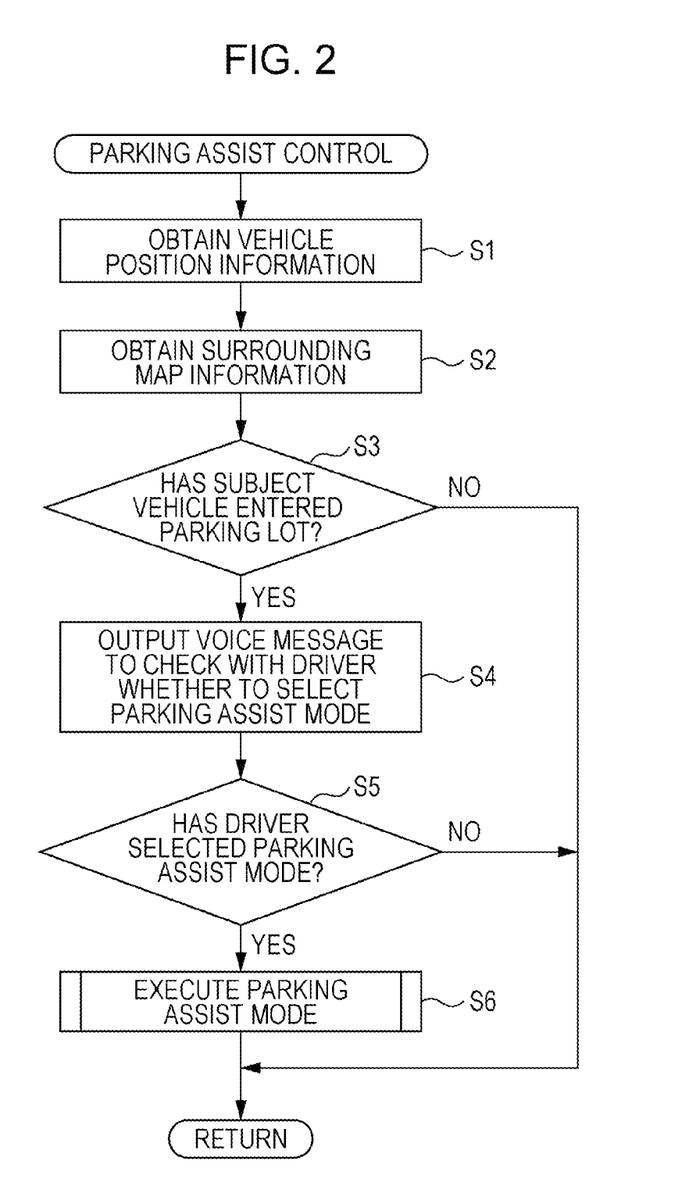
FIG. 2 is a flowchart illustrating a parking assist control routine.

In step S1, the driving assist control unit 11 obtains vehicle position information from the map locator unit 22. In step S2, the driving assist control unit 11 obtains surrounding map information on the environment around the vehicle M from the map locator unit 22, based on the vehicle position information.

Then, in step S3, the driving assist control unit 11 performs map matching to match the position of the vehicle M onto the surrounding map so as to check whether the vehicle M has entered a parking lot. If the vehicle M is found to have entered a parking lot, the driving assist control unit 11 proceeds to step S4. If the vehicle M has not entered a parking lot, the driving assist control unit 11 exits from the routine.

In step S4, the driving assist control unit 11 causes the notifying device 33 to output a voice message to check with the driver about whether to set the assist mode to the parking assist mode, and also displays the mode selection screen on the HMI monitor 31. Then, in step S5, the driving assist control unit 11 determines whether the driver has selected the parking assist mode. If the driver has selected the parking assist mode, the driving assist control unit 11 proceeds to step S6. If the driver has not selected the parking assist mode after the lapse of a predetermined time after the voice message is output or if the driver has selected manual driving on the HMI monitor 31, the driving assist control unit 11 exits from the routine.

In step S6, the driving assist control unit 11 executes the parking assist mode and exits from the routine. The parking assist mode is executed in accordance with a parking assist mode sub-routine illustrated in FIG. 3. In this sub-routine, while the driver is driving the vehicle M at low speed along a driving lane in the parking lot, in step S11, the driving assist control unit 11 obtains front-side environment information from the front-side recognition sensor 21 and front-left-side/front-right-side environment information from the front-left-side/front-right-side sensors 27 and the front-left-side/front-right-side recognition cameras 29.

Figure 3:
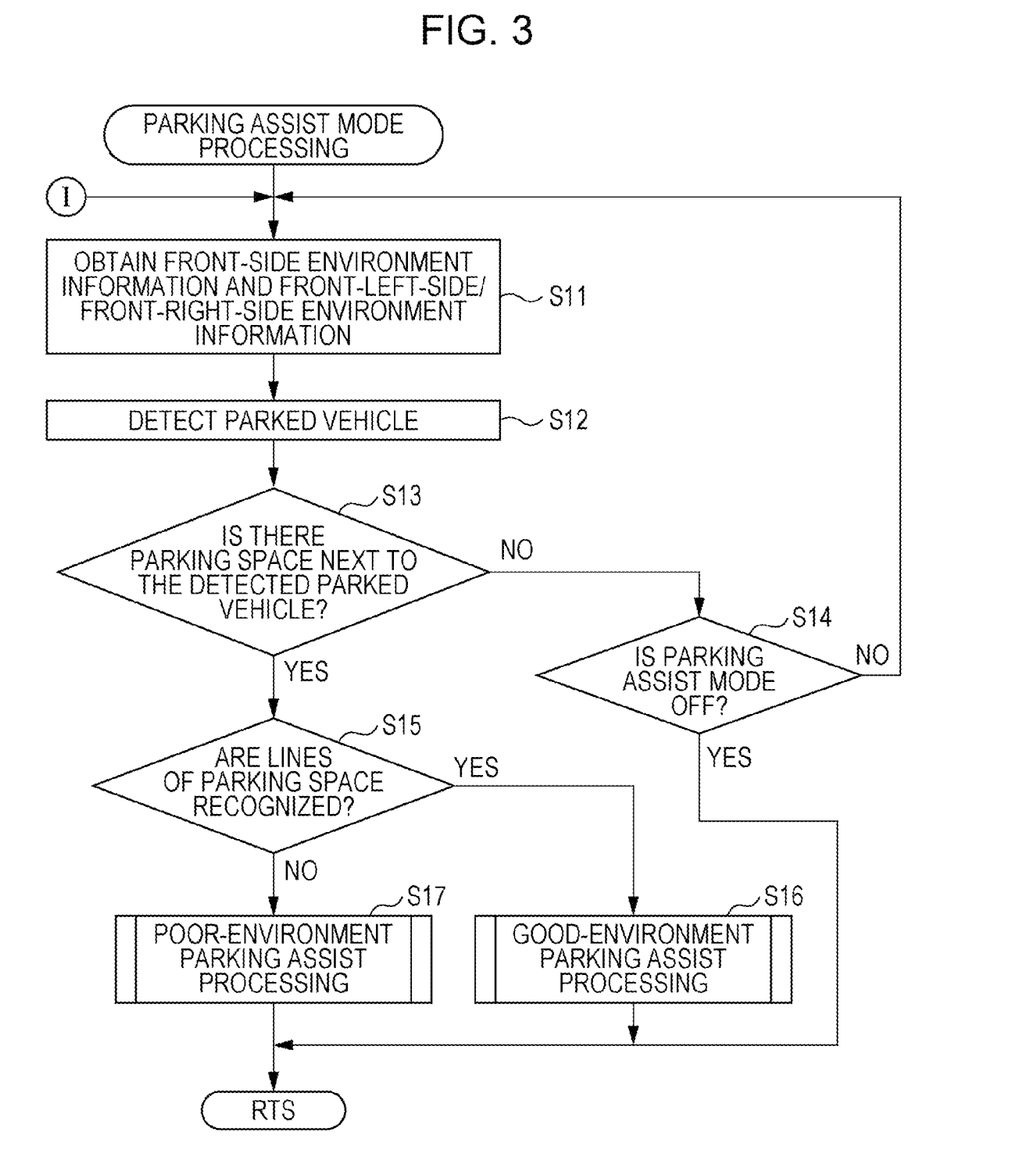
FIG. 3 is a flowchart illustrating a parking assist mode sub-routine.
Figure 5:
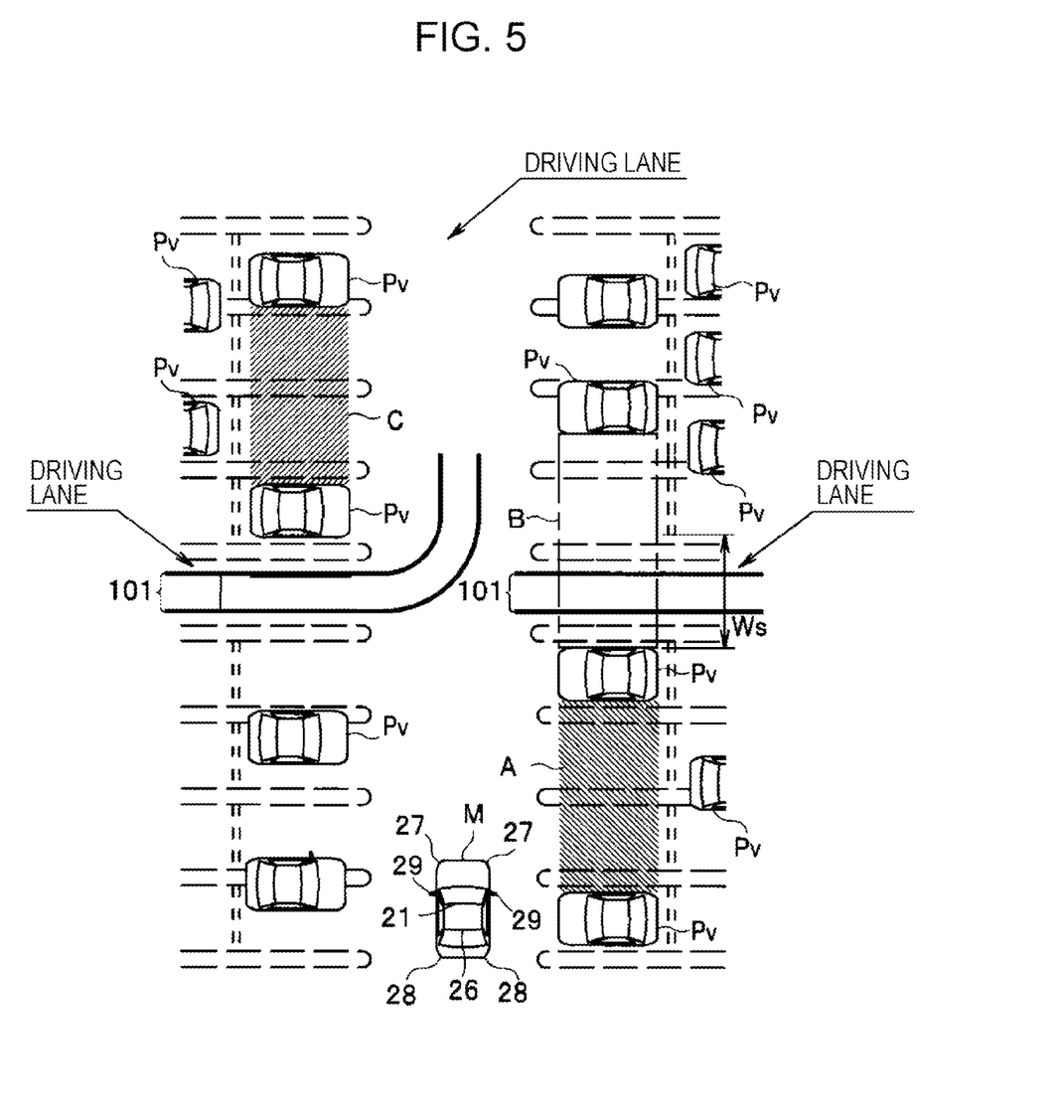

Then, in step S12, from the obtained front-side environment information and front-left-side/front-right-side environment information, the driving assist control unit 11 detects a vehicle (parked vehicle) Pv parked in a parking space on the left or right side of the driving lane. As illustrated in FIG. 5, based on the obtained front-side environment information and front-left-side/front-right-side environment information, the driving assist control unit 11 detects vehicles Pv parked side by side on the left and right sides of the driving lane while the vehicle M is driving at low speed. In one example, processing in step S12 may correspond to a parked vehicle detector.

Then, in step S13, the driving assist control unit 11 checks whether there is a parking space next to the detected parked vehicle Pv. The parking space is a space defined by parking space lines where a vehicle can park. The parking space has a predetermined width, which will be discussed later, and is a preset fixed value. If no parking space is found, the driving assist control unit 11 branches off to step S14. If a parking space is found, the driving assist control unit 11 proceeds to step S15.

In step S14, the driving assist control unit 11 checks whether the parking assist mode is OFF. If the parking assist mode is OFF, the driving assist control unit 11 exits from the routine. If the parking assist mode is still ON, the driving assist control unit 11 returns to step S11 and repeats steps S11 through S13. The parking assist mode is turned OFF when the driver has performed a certain operation using a certain device, such as the HMI monitor 31. The parking assist mode is automatically turned OFF when the driving assist control unit 11 has detected that the vehicle M has exited from the parking lot.

In step S15, the driving assist control unit 11 checks whether the lines of the parking space are being recognized. The parking space lines are drawn on the road surface on the left and right sides of the driving lane to divide parking spaces from each other. For example, based on the front-side environment information obtained from the front-side recognition sensor 21 and the front-left-side/front-right-side environment information obtained from the front-left-side/front-right-side sensors 27 and the front-left-side/front-right-side recognition cameras 29, the driving assist control unit 11 recognizes the parking space lines from the luminance difference between the road surface and the edges of the parking space lines or from a change in the intensity (reflectance) of light or waves reflected by the road surface and the parking space lines.

If it is determined in step S15 that the parking space lines are recognized, the driving assist control unit 11 proceeds to step S16. In step S16, the driving assist control unit 11 executes good-environment parking assist processing and then exits from the routine. Good-environment parking assist processing is the same as known parking assist processing for guiding a vehicle to a parking space based on parking space lines, and an explanation thereof will thus be omitted.

Conversely, if it is determined in step S15 that the parking space lines are not recognized, that is, if it is found that the parking space lines drawn on the road surface are not recognized because the road surface in the parking lot is covered with snow or mud after flooding, for example, the driving assist control unit 11 proceeds to step S17. In step S17, the driving assist control unit 11 executes poor-environment parking assist processing and exits from the routine. Poor-environment parking assist processing is executed in accordance with a poor-environment parking assist sub-routine illustrated in FIG. 4.

Figure 4:
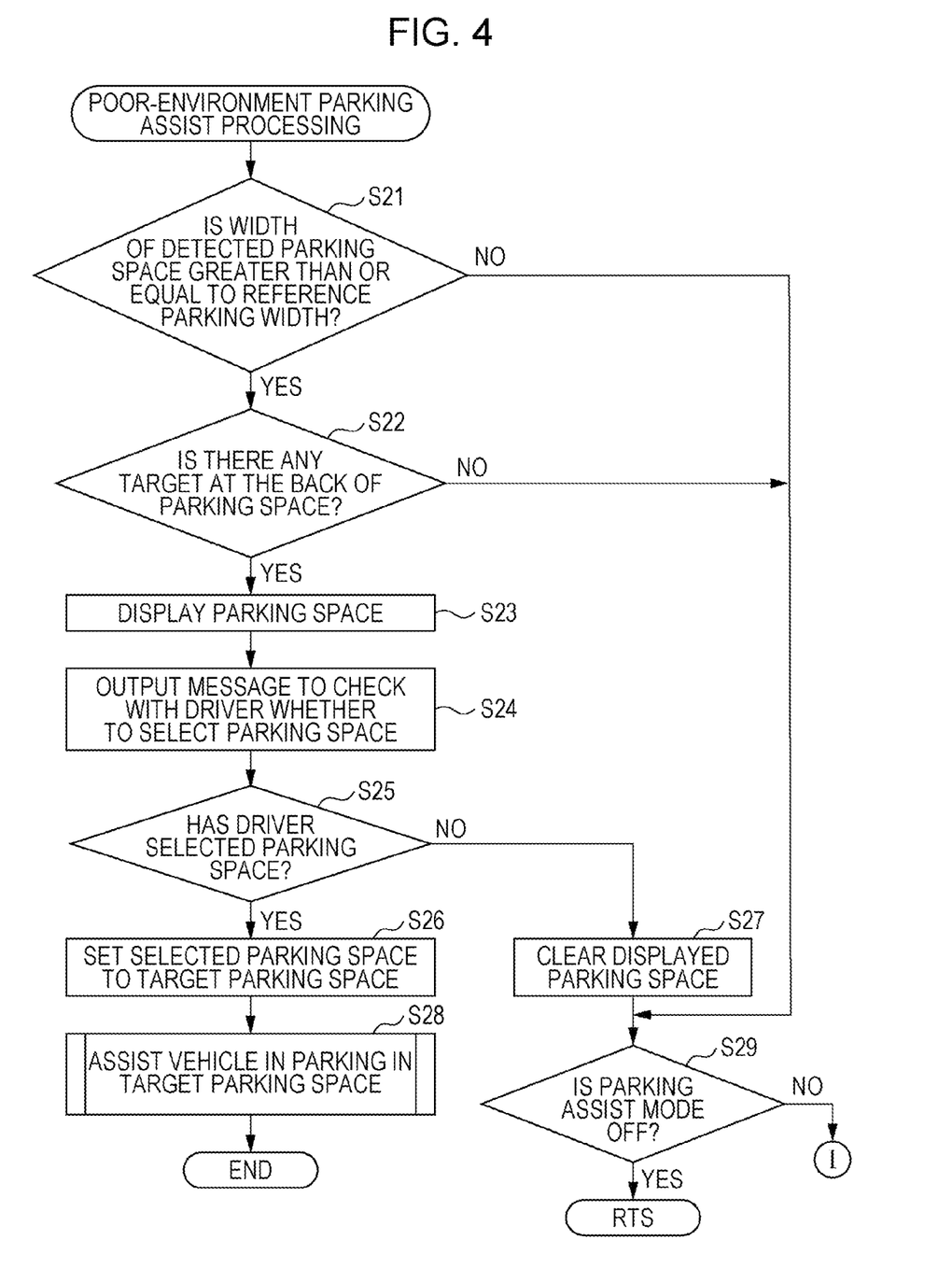
FIG. 4 is a flowchart illustrating a poor-environment parking assist sub-routine.

In this sub-routine, in step S21, the driving assist control unit 11 checks whether the width of the detected parking space in step S13 is greater than or equal to a preset reference parking width Ws. In one example, processing in step S21 may correspond to a space determiner.

Figure 6A:
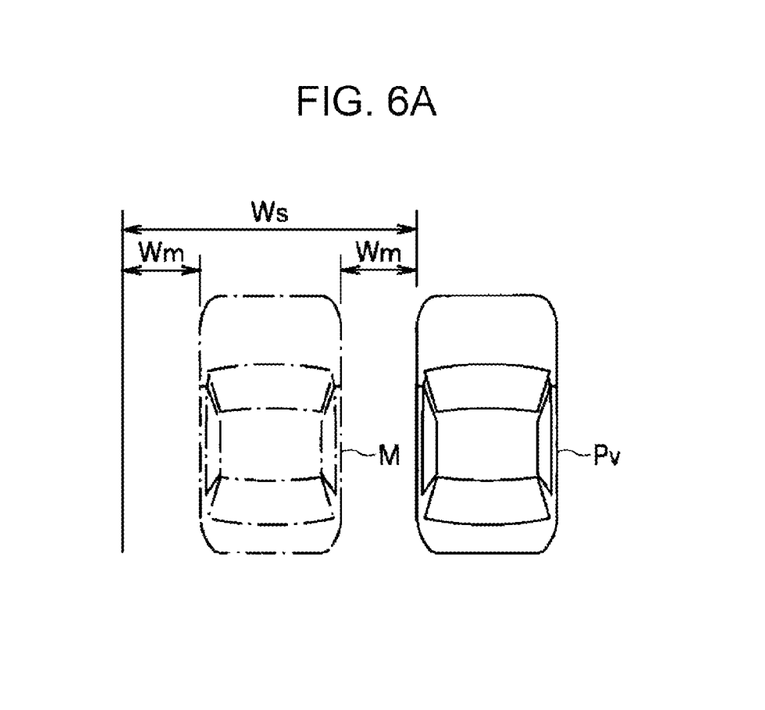
FIG. 6A is a schematic view for explaining a reference parking width which is used for a vehicle to park next to a parked vehicle.

As illustrated in FIG. 6A, the reference parking width Ws is determined by adding allowance widths (2×Wm) to the width of the vehicle M. The allowance widths are large enough for occupants to smoothly get in and out of the vehicle M when the left and right doors are opened. The reference parking width Ws is stored in advance in a storage, such as a ROM or a non-volatile memory, as fixed data.

If no vehicle Pv is parked in a location next to one parked vehicle Pv, it can be determined that the detected parking space has a width equal to the reference parking width Ws and that there is a parking space next to the detected parked vehicle Pv. Accordingly, the presence of a parking space may be determined based on one parked vehicle Pv. For instance, as illustrated in FIG. 6A, if the detected parking space next to one parked vehicle Pv has a width greater than or equal to the parking width Ws, it can be determined that there is a parking space. Measuring the width between two parked vehicles Pv is not always necessary.

Figure 6B:
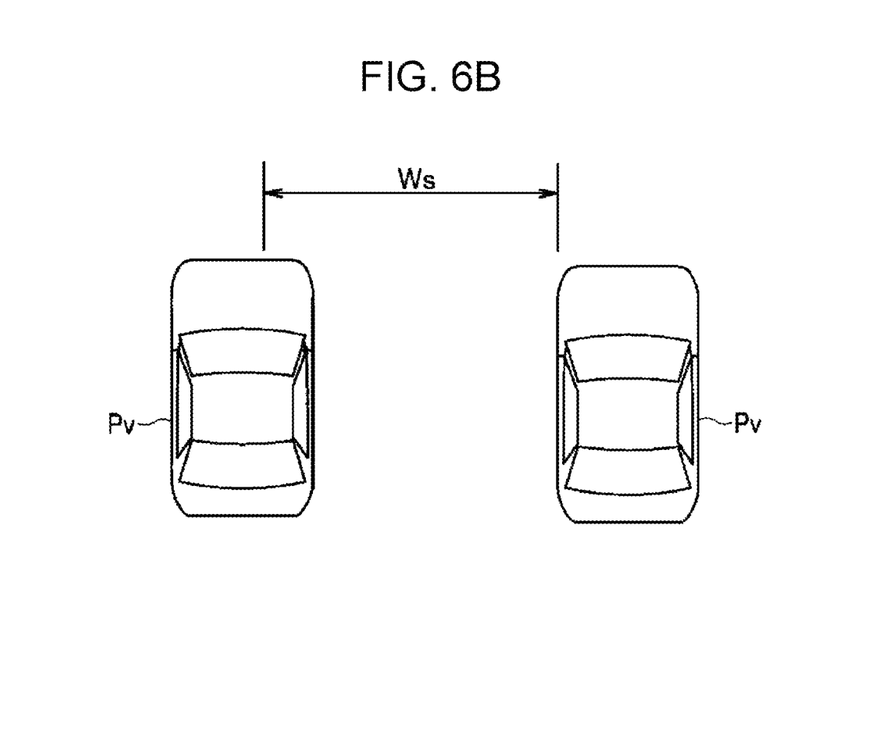
FIG. 6B illustrates a state in which a space between two parked vehicles is smaller than the reference parking width.

If there is a space greater than or equal to the reference parking width Ws, the driving assist control unit 11 proceeds to step S22. If the space between two vehicles Pv parked side by side is smaller than the reference parking width Ws, as illustrated in FIG. 6B, the driving assist control unit 11 determines that there is no parking space and proceeds to step S29.

In step S22, the driving assist control unit 11 checks whether a target object is detected at the back of the parking space within a range of the reference parking width Ws where the vehicle M is to be parked. A target object may be a parked vehicle Pv or an outer wall and is recognized based on the front-side environment information obtained by the front-side recognition sensor 21 and the front-left-side/front-right-side environment information obtained by the front-left-side/front-right-side sensors 27 and the front-left-side/front-right-side recognition cameras 29. In one example, processing in step S22 may correspond to a parking possibility determiner.

If a target object is detected at the back of the parking space within a range of the reference parking width Ws, the driving assist control unit 11 determines that the vehicle M can be parked in this space and proceeds to step S23. If no target object is detected within a range of the reference parking width Ws, the driving assist control unit 11 determines that this space is not a space where parking is allowed and proceeds to step S29. For example, as illustrated in FIG. 5, a parking space A on the near right hand and a parking space C on the far left hand, which are indicated by the hatched portions, are found to be spaces where parking are allowed since a vehicle Pv is parked at the back of each of the parking spaces A and C within a range of the reference parking width Ws. Conversely, a parking space B indicated by the long dashed dotted lines in the middle portion on the right hand is found to be a space where parking is not allowed since at least no target object (parked vehicle Pv in FIG. 5) is detected at the back of the parking space B within a range of the reference parking width Ws.

Figure 7:
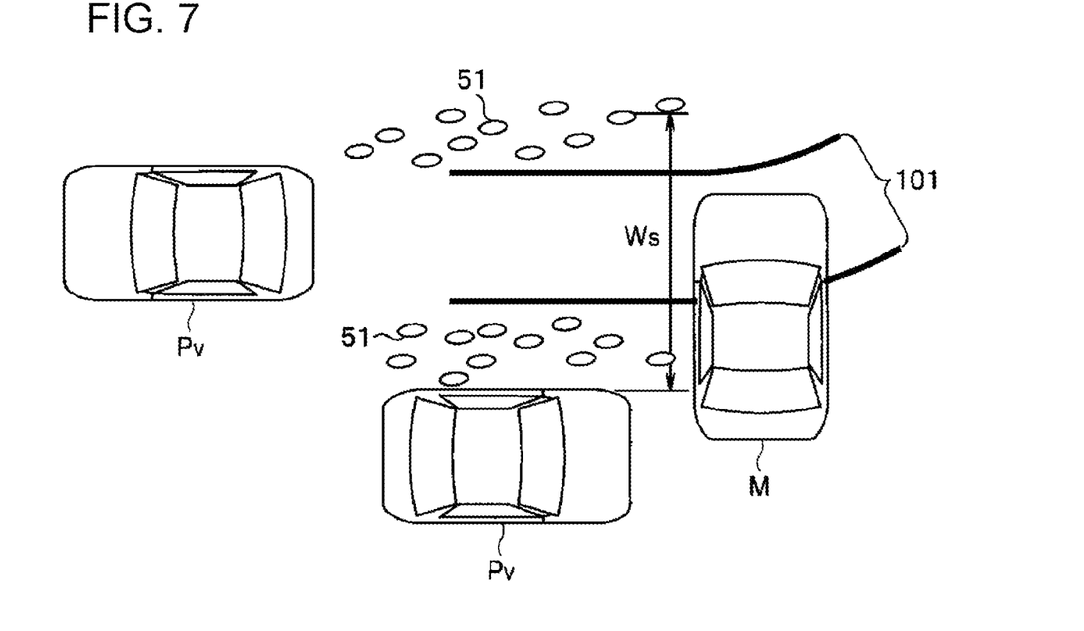
FIG. 7 illustrates a parking space as viewed from above, which is a space to be displayed on a monitor.

As illustrated in FIG. 7, for example, a parking space wider than the reference parking width Ws is found next to a vehicle Pv parked side by side with another vehicle Pv (not illustrated) to enter and exit from the driving lane. If another vehicle Pv, which is a target object, is parked at the back of this parking space within a range of the reference parking width Ws, it means that it is not possible to pass through this parking space. It can thus be determined that this parking space is a parking allowed space Ps. Even if tire tracks 101 and footprints 51 are detected in this parking space, as illustrated in FIG. 7, they can be assumed as the tire tracks 101 of a vehicle having entered and exited from this parking space and the footprints 51 of an occupant having got in and out of the vehicle.

Figure 8:
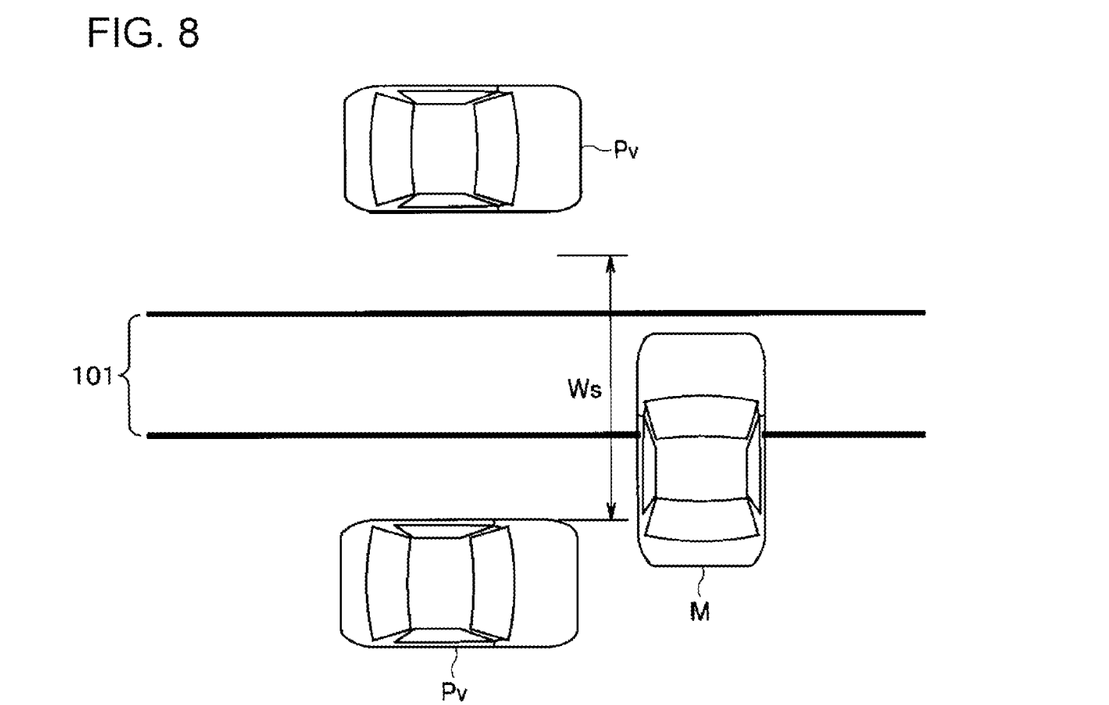
FIG. 8 illustrates a parking space as viewed from above, which is not a space to be displayed on a monitor.

Conversely, as illustrated in FIG. 8, if no target object is detected at the back of a parking space within a range of the reference parking width Ws, a vehicle or a passer-by can pass through this parking space. Hence, this parking space is highly likely to be a space where parking is prohibited, such as a driving lane or a sidewalk. The driving assist control unit 11 thus determines that this space is not a space where parking is allowed.

If it is determined in step S22 that a vehicle Pv, which is a target object, is parked at the back of the parking space, the driving assist control unit 11 proceeds to step S23. In step S23, the driving assist control unit 11 drives the HMI monitor 31 to display the parking allowed space Ps as viewed from above. In one example, processing in step S23 may correspond to a display driver. In one embodiment, the HMI monitor 31 may serve as "display".

The driving assist control unit 11 then proceeds to step S24 and drives the notifying device 33 to output a message to check with the driver about whether to select the parking allowed space Ps displayed on the HMI monitor 31. As indicated by the hatched portions in FIG. 5, a parking allowed space is detected when the vehicle M is approaching and passing by this parking space. As illustrated in FIG. 10A, every time the vehicle M is approaching and passing by a parking allowed space Ps, the parking allowed space Ps is displayed on the HMI monitor 31. Even when the vehicle M is passing by the parking space B illustrated in FIGS. 5 and 9, the parking space B is not displayed on the HMI monitor 31 since it is determined to be a space where parking is not allowed.

The driving assist control unit 11 then proceeds to step S25 to determine whether the driver has selected the parking allowed space Ps displayed on the HMI monitor 31. For instance, in the parking lot illustrated in FIG. 5, on the right and left sides of the driving lane where the vehicle M is driving, the parking spaces A and C respectively indicated by the hatched portions at the near right hand and the far left hand and the parking space B in the middle portion on the right hand are found. The parking spaces A and C have been determined as parking allowed spaces Ps, while the parking space B in the middle portion on the right hand is determined to be a space where parking is not allowed since at least no target object is detected at the back of the parking space B within a range of the reference parking width Ws. In one example, processing in steps S23 through S25 may correspond to a selector.

Figure 10A:
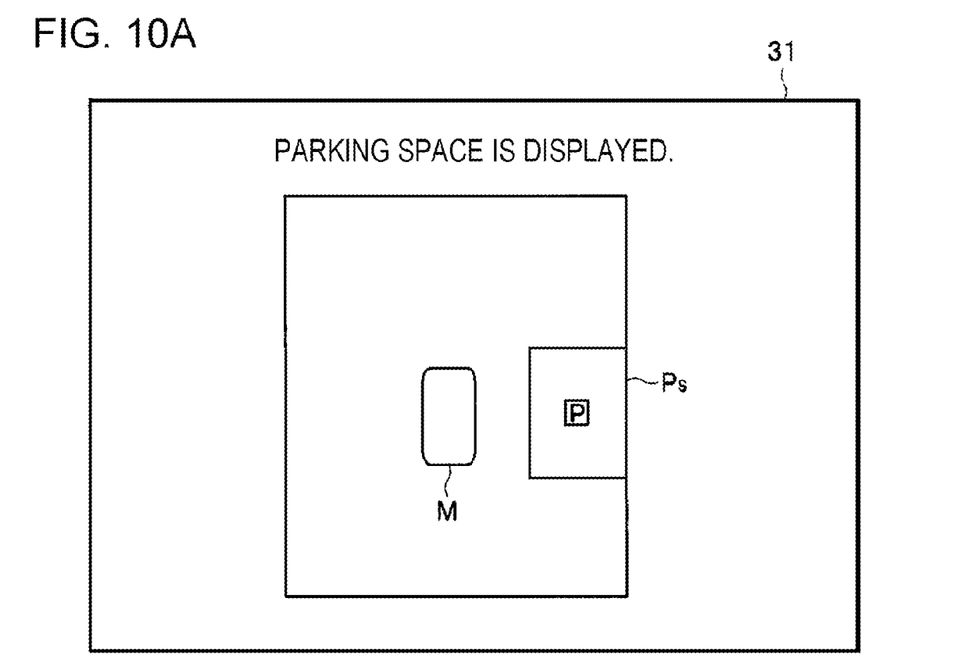
FIG. 10A illustrates a state in which a parking space is displayed as viewed from above on a human machine interface (HMI) monitor.
Figure 10B:
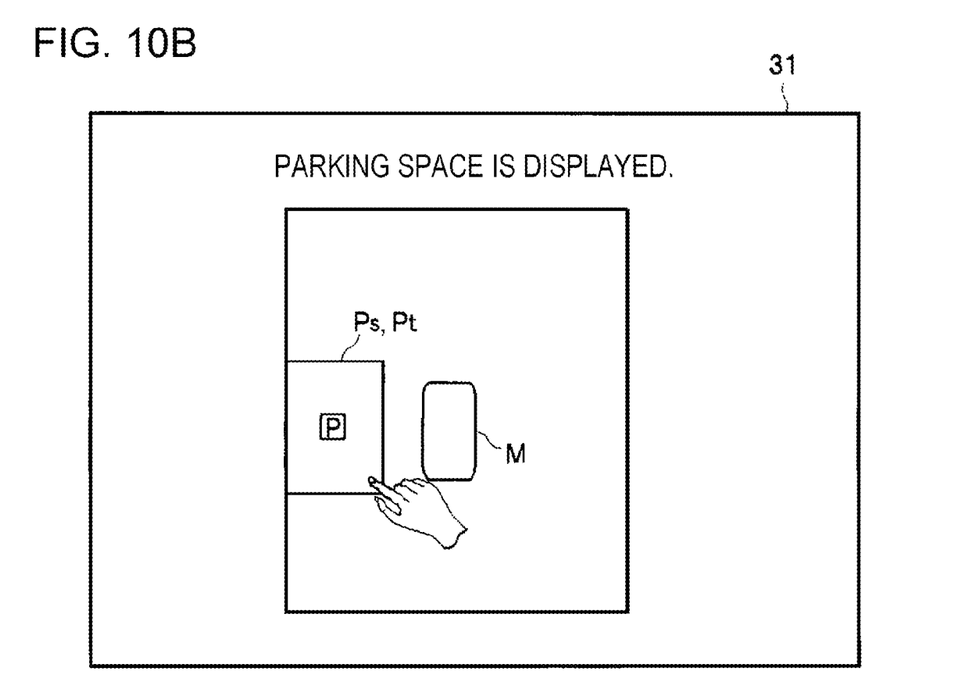
FIG. 10B illustrates a state in which a driver has selected a parking space displayed as viewed from above on an HMI monitor.

As illustrated in FIG. 10B, the parking space C is displayed on the HMI monitor 31 as a parking allowed space Ps when the vehicle M is approaching the parking space C.

If it is determined in step S25 that the driver has selected the parking allowed space Ps displayed on the HMI monitor 31, the driving assist control unit 11 proceeds to step S26. If a predetermined time has elapsed after the message is output or if the vehicle M has passed by the parking allowed space Ps displayed on the HMI monitor 31, the driving assist control unit 11 branches off to step S27.

For example, when the parking space A on the near right hand illustrated in FIG. 5 is displayed on the HMI monitor 31 as a parking allowed space Ps, if the driver has passed by the parking allowed space Ps without selecting it, the driving assist control unit 11 branches off to step S27.

In step S27, the driving assist control unit 11 clears the parking allowed space Ps displayed on the HMI monitor 31 and proceeds to step S29 to determine whether the parking assist mode is OFF. If the parking assist mode is found to be OFF, the driving assist control unit 11 exits from the routine. If the parking assist mode is found to be ON, the driving assist control unit 11 returns to step S11 in FIG. 3 and detects the next parked vehicle Pv, based on the front-side environment information and front-left-side/front-right-side environment information. S29 is executed similarly to step S14 in FIG. 3.

When the vehicle M is approaching the parking space C on the far left hand indicated by the hatched portion in FIG. 5, the parking space C is recognized as a parking allowed space Ps and is displayed on the HMI monitor 31. Then, if the driver touches the parking allowed space Ps on the HMI monitor 31, as illustrated in FIG. 10B, the driving assist control unit 11 determines in step S25 that the driver has selected the parking allowed space Ps and proceeds to step S26.

In step S26, the driving assist control unit 11 sets the parking allowed space Ps (the one on the far left hand in FIG. 5) selected by the driver to a target parking space Pt (see FIGS. 9 and 10B) and proceeds to step S28. In step S28, the driving assist control unit 11 forms a target parking guiding route Gr for guiding the vehicle M to the target parking space Pt and performs control to automatically park the vehicle M in the target parking space Pt in accordance with the target parking guiding route Gr. The driving assist control unit 11 then completes the routine. In one example, processing in steps S26 and S28 may correspond to a parking assister.

Figure 9:
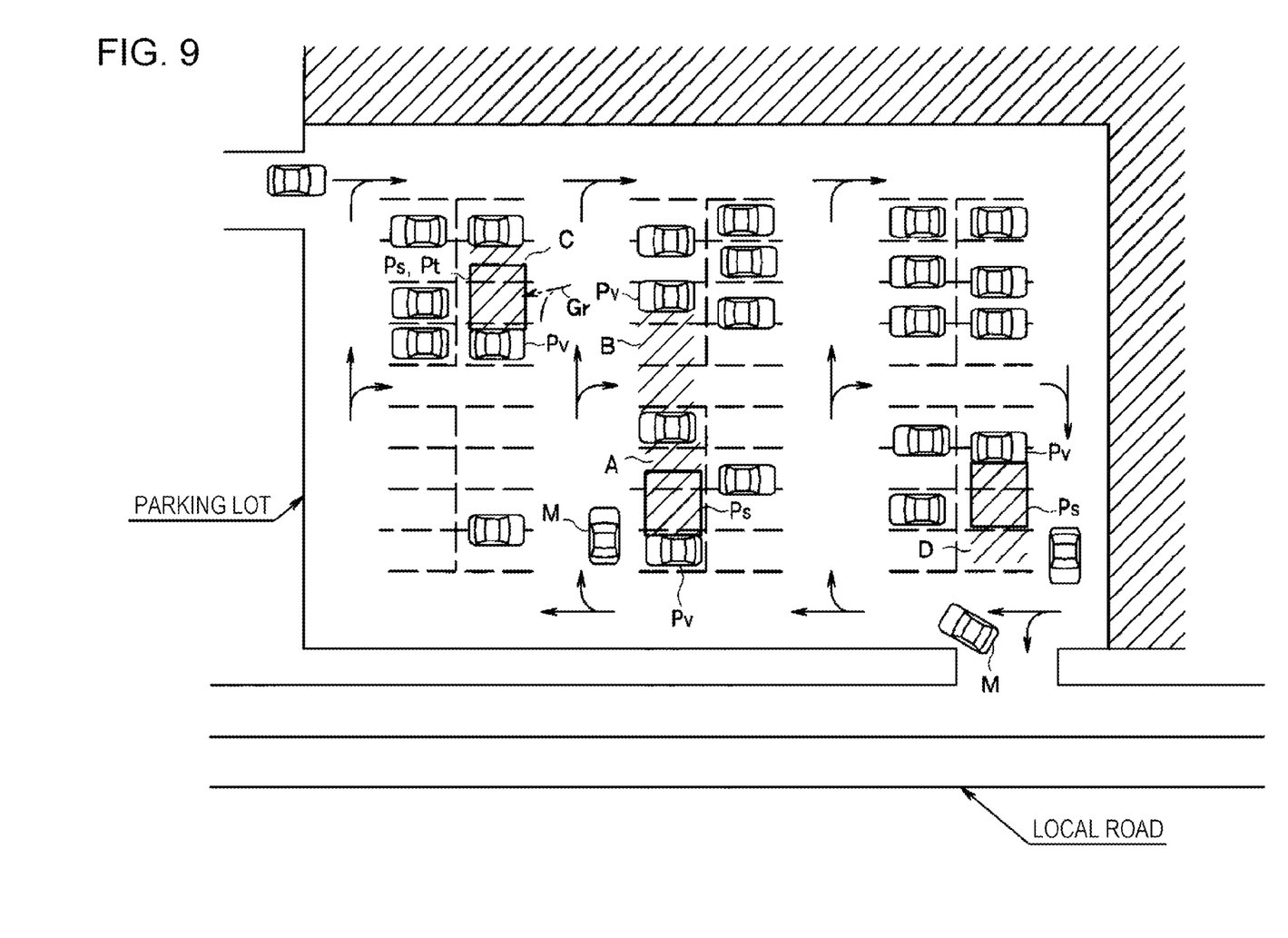
FIG. 9 is a bird's eye view of the entire parking lot where parking spaces are detected.

In automatic-parking assist processing executed by the driving assist control unit 11, as illustrated in FIG. 9, a virtual parking space having the reference parking width Ws is set next to a parked vehicle Pv (vehicle Pv on the far left hand in FIG. 9) in a parking allowed space Ps selected by a driver. This virtual parking space is set to be a target parking space Pt, and then, a target parking guiding route Gr for guiding the vehicle M to the target parking space Pt is formed. The target parking guiding route Gr is set so that the widthwise center of the vehicle M matches the widthwise center of the target parking space Pt. If, for example, the width of the parking allowed space Ps is smaller than or equal to a predetermined value with respect to the reference parking width Ws (if the parking allowed space Ps is twice as large as the reference parking width Ws), the widthwise center of the parking allowed space Ps may be set as the widthwise center of the target parking space Pt.

Then, the driving assist control unit 11 performs control to automatically park the vehicle M in the target parking space Pt as determined above and completes the routine.

According to the above-described parking assist control, as a result of the vehicle M driving around the driving lane of the parking lot, information on the overall positions of the vehicles Pv parked in the parking lot can be obtained, as illustrated in FIG. 9. Every time the vehicle M is approaching a parking allowed space Ps indicated by the hatched portion in FIG. 9, the parking allowed space Ps is displayed as viewed from above on the HMI monitor 31.

As discussed above, in the embodiment, when assisting a vehicle in automatically parking in a parking space in a parking lot, it is first checked whether a parking space where the vehicle M is to be parked is found next to a parked vehicle Pv. If a parking space is detected, it is determined whether lines, which define this parking space, are recognized in the detected parking space. If no lines are recognized due to some reason, such as snow or mud after flooding, poor-environment parking assist processing is executed.

In poor-environment parking assist processing, it is determined whether the width of the parking space detected next to the parked vehicle Pv is greater than or equal to the reference parking width Ws. Even when the parking space has a width greater than or equal to the reference parking width Ws, if no target object is detected at the back of this parking space within a range of the reference parking width Ws, this parking space is determined to be a location where parking is not allowed. This can reduce the possibility that such a location is wrongly recognized as a parking allowed space, thereby making it less likely to disappoint a driver.

The disclosure is not restricted to the above-described embodiment. For example, in step S28, the target parking guiding route Gr may be displayed on the HMI monitor 31 such that it is superimposed on a plan view of the surroundings of a parking space where the vehicle M is to be parked, and the driver may park the vehicle M by himself/herself in accordance with the target parking guiding route Gr.

According to an embodiment of the disclosure, even when the width of a parking space next to a parked vehicle is found to be greater than or equal to a reference parking width, if no target object is detected at the back of the parking space within a range of this parking width, it is determined that this parking space is not a space where parking is allowed. With this configuration, when assisting a vehicle in parking in a parking space using a parking assist function, even when the lines of a parking space are not recognized, it is less likely that a location where parking is prohibited is wrongly recognized as a parking space, thereby making it less likely to disappoint a driver.

The driving assist control unit 11 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the driving assist control unit 11 including the driving assist mode and the parking assist mode. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A parking assist system to be applied to a vehicle, the parking assist system being configured to guide the vehicle to a parking space in a parking lot, the parking assist system comprising:
   an environment information obtainer configured to obtain environment information on an environment around the vehicle;
   a storage configured to store a reference parking width to be used for parking the vehicle;
   a parked vehicle detector configured to detect a parked vehicle in the parking lot, based on the environment information obtained by the environment information obtainer;
   a space determiner configured to compare a width of a space next to the parked vehicle detected by the parked vehicle detector with the reference parking width and to determine whether the width of the space is greater than or equal to the reference parking width; and
   a parking possibility determiner configured to:
      in a case where the space determiner has determined that the width of the space next to the parked vehicle is greater than or equal to the reference parking width, determine whether a target object is detected at a back side of the space, based on the environment information obtained by the environment information obtainer;
      determine that parking in the space is prohibited in a case where the target object is not detected; and
      determine that parking in the space is allowed in a case where the target object is detected.

2. The parking assist system according to claim 1, wherein the parking possibility determiner is configured to determine that parking in the space is prohibited in a case where the target object is detected but is not detected within a range of the reference parking width of the space.

3. The parking assist system according to claim 1, further comprising:
   a display driver configured to drive a display,
   wherein the display driver does not cause the display to display the space in a case where the parking possibility determiner determines that the parking in the space is prohibited and causes the display to display the space in a case where the parking possibility determiner determines that the parking in the space is allowed.

4. The parking assist system according to claim 2, further comprising:
   a display driver configured to drive a display,
   wherein the display driver does not cause the display to display the space in a case where the parking possibility determiner determines that the parking in the space is prohibited and causes the display to display the space in a case where the parking possibility determiner determines that the parking in the space is allowed.

5. The parking assist system according to claim 3, further comprising:

a selector configured to check with a driver who drives the vehicle about whether to select the space displayed on the display, in which the parking is allowed; and a parking assister configured to, in a case where the driver has selected the space set the space to be a target parking space and set a parking guiding route for guiding the vehicle to the target parking space.

6. The parking assist system according to claim 4, further comprising:

a selector configured to check with a driver who drives the vehicle about whether to select the space displayed on the display, in which the parking is allowed; and a parking assister configured to, in a case where the driver has selected the space set the space to be a target parking space and set a parking guiding route for guiding the vehicle to the target parking space.

7. A parking assist system to be applied to a vehicle, the parking assist system being configured to guide the vehicle to a parking space in a parking lot, the parking assist system comprising:

a sensor configured to obtain environment information on an environment around the vehicle;

a storage configured to store a reference parking width to be used for parking the vehicle; and circuitry configured to:

detect a parked vehicle in the parking lot, based on the environment information obtained by the sensor;

compare a width of a space next to the detected parked vehicle with the reference parking width;

determine whether the width of the space is greater than or equal to the reference parking width;

in a case where the width of the space next to the parked vehicle is found to be greater than or equal to the reference parking width, determine whether a target object is detected at a back side of the space, based on the environment information;

determine that parking in the space is prohibited in a case where the target object is not detected; and determine that parking in the space is allowed in a case where the target object is detected.

\* \* \* \* \*